(12) United States Patent
Bosterling et al.

(10) Patent No.: US 9,523,174 B2
(45) Date of Patent: Dec. 20, 2016

(54) SYSTEM FOR FASTENING A RAIL ON A SUBSURFACE

(71) Applicant: Vossloh-Werke GmbH, Werdohl (DE)

(72) Inventors: Winfried Bosterling, Neuenrade (DE); Adrian Bednarczyk, Ludenscheid (DE)

(73) Assignee: Vossloh-Werke GmbH, Werdohl (DE)

( * ) Notice: Subject to any disclaimer, the term of this patent is extended or adjusted under 35 U.S.C. 154(b) by 0 days.

(21) Appl. No.: 14/774,977

(22) PCT Filed: Mar. 10, 2014

(86) PCT No.: PCT/EP2014/054543
§ 371 (c)(1),
(2) Date: Sep. 11, 2015

(87) PCT Pub. No.: WO2014/139925
PCT Pub. Date: Sep. 18, 2014

(65) Prior Publication Data
US 2016/0017545 A1    Jan. 21, 2016

(30) Foreign Application Priority Data
Mar. 13, 2013  (DE) ........................ 10 2013 102 531

(51) Int. Cl.
| | | |
|---|---|---|
| *E01B 9/44* | (2006.01) | |
| *E01B 9/02* | (2006.01) | |
| *E01B 9/40* | (2006.01) | |
| *F16B 21/08* | (2006.01) | |

(52) U.S. Cl.
CPC . *E01B 9/44* (2013.01); *E01B 9/02* (2013.01); *E01B 9/40* (2013.01); *F16B 21/086* (2013.01)

(58) Field of Classification Search
CPC .......... E01B 9/303; E01B 9/306; E01B 9/486; E01B 9/02; E01B 9/44; E01B 9/40; E01B 9/483; E01B 9/30; E01B 9/34; F16B 21/086; F16B 19/1081
USPC ................................................. 238/349, 351
See application file for complete search history.

(56) References Cited

U.S. PATENT DOCUMENTS

| | | | |
|---|---|---|---|
| 8,444,100 B2* | 5/2013 | Takahashi | B60K 15/05 211/193 |
| 2011/0014005 A1* | 1/2011 | Shinozaki | F16B 5/0628 411/347 |
| 2013/0015256 A1* | 1/2013 | Bednarczyk | E01B 9/685 238/315 |

FOREIGN PATENT DOCUMENTS

| | | | |
|---|---|---|---|
| DE | 202011050739 U1 | 3/2012 | |
| WO | WO 2012/082636 | * 6/2012 | |

* cited by examiner

*Primary Examiner* — Mark Le
(74) *Attorney, Agent, or Firm* — The Webb Law Firm

(57) ABSTRACT

A system for fastening a rail on a subsurface, includes a support plate having a contact surface, and at least one guide plate that is seated on said support plate and has a passage opening for a clamping element, which leads from the free top side thereof to the bottom side thereof. The clamping element is guided through the passage opening and is fixedly connected to the subsurface. A latching connection between the support plate and the guide plate is formed in the region of the passage opening by at least one latch arm. The latch arm engages through said passage opening and has a latch projection which interacts in an interlocking manner with a stop formed on said guide plate. A recess is molded into the circumferential surface delimiting said passage opening of said guide plate, in which recess the respectively associated latch arm is seated.

15 Claims, 4 Drawing Sheets

SYSTEM FOR FASTENING A RAIL ON A SUBSURFACE

CROSS-REFERENCE TO RELATED APPLICATIONS

This application is the United States national phase of International Application No. PCT/EP2014/054543 filed Mar. 10, 2014, and claims priority to German Patent Application No. 10 2013 102 531.5 filed Mar. 13, 2013, the disclosures of which are hereby incorporated in their entirety by reference.

BACKGROUND OF THE INVENTION

1. Field of the Invention

The invention relates to a system for fastening a rail on a subsurface, which comprises a support plate having a contact area for the rail to be fastened, and at least one guide plate that sits on the support plate and has an opening for a clamping element, which leads from the free top side thereof to the bottom side thereof which rests on the support plate, which clamping element is guided, with the system fully mounted, through the opening and is fixedly connected to the subsurface, wherein a latching connection between the support plate and the guide plate is provided in the region of the opening of the guide plate through at least one latch arm that engages through the opening of the guide plate and has a latching projection on the free end thereof, which interacts in an interlocking manner with a stop formed on the guide plate.

2. Description of Related Art

A system having the features listed above is known from German utility model no. DE 20 2011 050 739 U1. In order to produce the latching connection between the support plate and the guide plate, the latch arms are formed here on the support plate in such a way that they engage through the passage opening of the guide plate and lock into the top edge of the guide plate which delimits the passage opening. The advantage of this embodiment consists in the fact that in this way any known guide plate can be coupled to the support plate, without the respective guide plate having to be modified to do so. In practice, however, this advantage can only be utilised to a minor extent. Thus, in a case where a commercial clamping element such as for example a screw, a bolt or a nail is to be used for fastening the system to the respective subsurface, it is necessary for a simple and secure mounting of the known system that the clear diameter of the opening of the guide plate is adapted to the external diameter of the clamping element in such a way that the clamping element can be pushed through the opening with sufficient play even if the latch arm engages in the opening. Since the respective clamping element is not usually supported directly on the guide plate, but acts directly only on the spring element resting on the guide plate, the latch element engaging through the opening of the guide plate will then not hinder the function of the clamping element. However, in many cases an excessive dimensioning of the opening cross section of the guide plate relative to the respective clamping means is undesirable because it makes an exact positioning of the guide plate in relation to the clamping means or the subsurface more difficult.

SUMMARY OF THE INVENTION

In the light of the prior art explained above, it was the object of the invention to provide a system of the type described above, in which the mounting on the respective subsurface has been further simplified.

Advantageous embodiments of the invention are set out in the dependent claims and will be explained in detail below, as will be the general inventive concept.

A system according to the invention for fastening a rail on a subsurface comprises, in line with the prior art indicated above, a support plate having a contact area for the rail to be fastened, and at least one guide plate that is seated on the support plate and has an opening for a clamping element, which opening leads from the free top side thereof to the bottom side resting on the support plate, which clamping element is guided, once the system has been fully mounted, through the opening and is fixedly connected to the subsurface. In this context, a latching connection is formed between the support plate and the guide plate in the region of the opening of the guide plate by at least one latch arm that engages through the opening of the guide plate and has a latching projection on the free end thereof, which interacts in an interlocking manner with a stop formed on the guide plate.

According to the invention, a recess is moulded into the circumferential surface delimiting the guide plate, in which recess the respectively associated latch arm is seated. Consequently, in a system according to the invention additional space is provided in the region of the passage opening of the guide plate provided for the clamping means, which space receives, when the guide plate is locked together with the support plate, the respective latch arm extending from the support plate. The passage opening itself therefore no longer needs to receive the latch arm in addition to the clamping means. Consequently, the opening cross section of the passage opening may be optimally adapted to the cross section of the clamping means, so that the clamping means is tightly guided in the passage opening. In this respect, the latch arm that is respectively seated in an interlocking manner in the recess of the guide plate associated therewith serves as a twist lock that prevents any greater rotation of the guide plate about an axis extending through the passage opening of the guide plate and/or about the longitudinal axis of the clamping means inserted in the passage opening in the fully mounted condition.

In a system according to the invention, an exact alignment of the components "guide plate" and "support plate" in relation to one another and to the firm subsurface, on which the respective rail is to be fastened by means of the system according to the invention, is achieved with very simple means. At the same time, the guide plate and the support plate can be pre-mounted in a simple manner without any problems, because the locking together of these two components can be carried out in a manner per se known principally without any modification. At the installation site, the modular unit formed by the at least one guide plate and the support plate can be placed in a simple manner on the correspondingly prepared subsurface.

Irrespective of whether the guide plate and the support plate are mounted separately from each other or as a pre-mounted modular unit at the building site, the interlocking connection between the guide plate and the support plate, which according to the invention is formed by means of a latching connection, ensures that the guide plate and the support plate are properly aligned relative to each other at their installation site, without any particular care being necessary for the positioning of the guide plate and the support plate. Due to the locking together of the guide plate and the support plate, all that needs to be done is to position the support plate on the firm subsurface in the required manner. A cumbersome aligning of the guide plate in relation to the support plate will then be avoided as well as the necessity to check the proper positioning of the guide plate prior to mounting the further components of a system according to the invention.

Thus, the invention provides a system for fastening a rail on a subsurface that distinguishes itself by a particularly simple installability and wherein at the same time the correct positional orientation of the individual components of the system in a fully mounted condition is ensured in a simple manner and with little effort.

In relation to the producibility of the support plate provided in a system according to the invention it has proven to be expedient if the latch arm has associated therewith a recess moulded into the support plate, which recess laterally joins on to a lateral surface of the latch arm. On the one hand, the recess enhances the elasticity in the region of the joint between the latch arm and the support plate in such a way that the latch arm has an elasticity that is optimal for the latching connection during use. This effect occurs not only if the support plates are made from a plastics material, but also if they are made from metal sheet. Moreover, in the case of support plates made from a plastics material, the material volume removed in the area of the recess is available for shaping the respective latch arm.

In a system according to the invention, what is used as a stop for the latch projection is for example an edge region of the top side of the guide plate, which delimits, at least in sections, the passage opening of the guide plate. Apart from a simple shaping, this has the further advantage that the free end of the latch arm serving as a latch element can be reached without any problems if the connection between the guide plate and the support plate is to be retrospectively released for example in order to replace the guide plate.

The locking together of the guide plate and the support plate can be optimised by placing the locking point in an opening due to the fact that at least two latch arms, which together engage through the opening of the guide plate, are provided and that each latch arm has associated therewith respectively one recess moulded into the circumferential surface delimiting the opening, in which recess the respective latch arm is seated. As a result of the locking together of the support plate and the guide plate, which is provided for in at least two places, the guide plate centres itself as it is placed on the support plate and is, also by itself, retained in the respectively optimal position.

As has already been explained, in many known rail fastening systems, the guide plates are respectively provided with a central opening, through which, with the system fully mounted, a clamping element is guided which is formed as a screw, a bolt or a nail. The clamping element clamps a spring element supported on the guide plate directly or indirectly against the respective subsurface, which spring element exerts the force necessary for holding down the rail to be fastened using the system according to the invention onto the foot of the rail.

In case the clamping element is to be directly connected to the respective subsurface, an opening corresponding to the opening of the guide plate is to be provided in the support plate, so that during the mounting process, the clamping element can be guided to the subsurface through the opening of the guide plate and the associated opening of the support plate.

The opening delimited, at least in sections, laterally in relation to the respective latch arm is, especially in combination with a recess inserted into the support plate laterally in relation to the latch arm, particularly advantageous because it allows to ensure a particularly great elasticity of the latch arm that is connected to the support plate in this case only via lands that act in the manner of torsion springs.

In order to avoid any restriction of the effectively usable cross section for guiding the clamping means through the passage opening of the guide plate, the depth of the recess moulded into the circumferential surface delimiting the opening respectively associated with the latch arm should at least correspond to the thickness of the respectively associated latch arm. In this embodiment, the recess receives the latch arm, so that the latch arm no longer protrudes, on the guide plate coupled to the support plate, at all into the opening cross section of the passage opening of the guide plate, which can be used for the clamping element.

Both the guide plate and the support plate may be made from a plastics material in a manner per se known.

In order to save on material and weight, recesses may be moulded both into the guide plate and into the support plate from the bottom side of the respective plate. By separating these recesses from each other by means of ribs, an optimised rigidity of the respective plate can be achieved.

A system according to the invention will be particularly practice-orientated if the support plate has two lateral sections disposed opposite one another, which delimit the contact area between them. In this case, a guide plate may be seated respectively on each of the lateral sections, which are respectively retained on the support plate by a latching connection. In this way, a complete modular unit is provided which can be mounted in a simple manner and which at the same time provides the precondition for ensuring that all the further components necessary for fastening the respective rail can easily find the place that is optimal for their function.

In order to additionally support the latter, form elements such as projections and indentations for guiding a spring element that can be supported on the guide plate may, also in a manner per se known, be formed on the free top side of the at least one guide plate of a system according to the invention.

A support of the guide plate on the support plate may be supported also by providing the support plate with respectively one shoulder, on which the respectively associated guide plate is supported, on at least one of its two ends which are laterally opposite each other. An embodiment of the invention, which is particularly suitable for practical use, distinguishes itself here by the fact that the support plate has a shoulder on each of its lateral ends, that a guide plate is respectively supported on each of the shoulders, that the guide plates laterally delimit the contact area for the rail, which is provided on the support plate, and that each of the guide plates is retained on the support plate by means of a latching connection.

The locking together of the guide plate and the support plate according to the invention is particularly suitable for systems where the guide plate is formed as an angular guide plate having a guide section resting on the lateral portion of the support plate, which is associated with the guide plate, and a guide section that rests on the associated side of the support plate.

Where a rail fastening system according to the invention is supposed to have a defined resilience in a direction oriented perpendicularly to the top side of the support plate, this can be ensured in a known manner by providing an elastic layer that lies on the contact surface of the support plate. In order to simplify also the mounting of this as much as possible, the elastic layer can be retained on the support plate by means of the guide plate locked together with the support plate. This can be realised by way of arranging the elastic layer and the guide plate in an overlapping manner at least in sections, so that the guide plate locked together with the support plate retains the elastic layer on the support plate in an interlocking manner. For the same purpose, the guide plate may include at least one recess that is engaged by a projection of the elastic layer.

BRIEF DESCRIPTION OF THE DRAWINGS

The invention will be explained in more detail below by means of a drawing that illustrates an embodiment example, wherein.

DETAILED DESCRIPTION OF THE INVENTION

Figure 1:
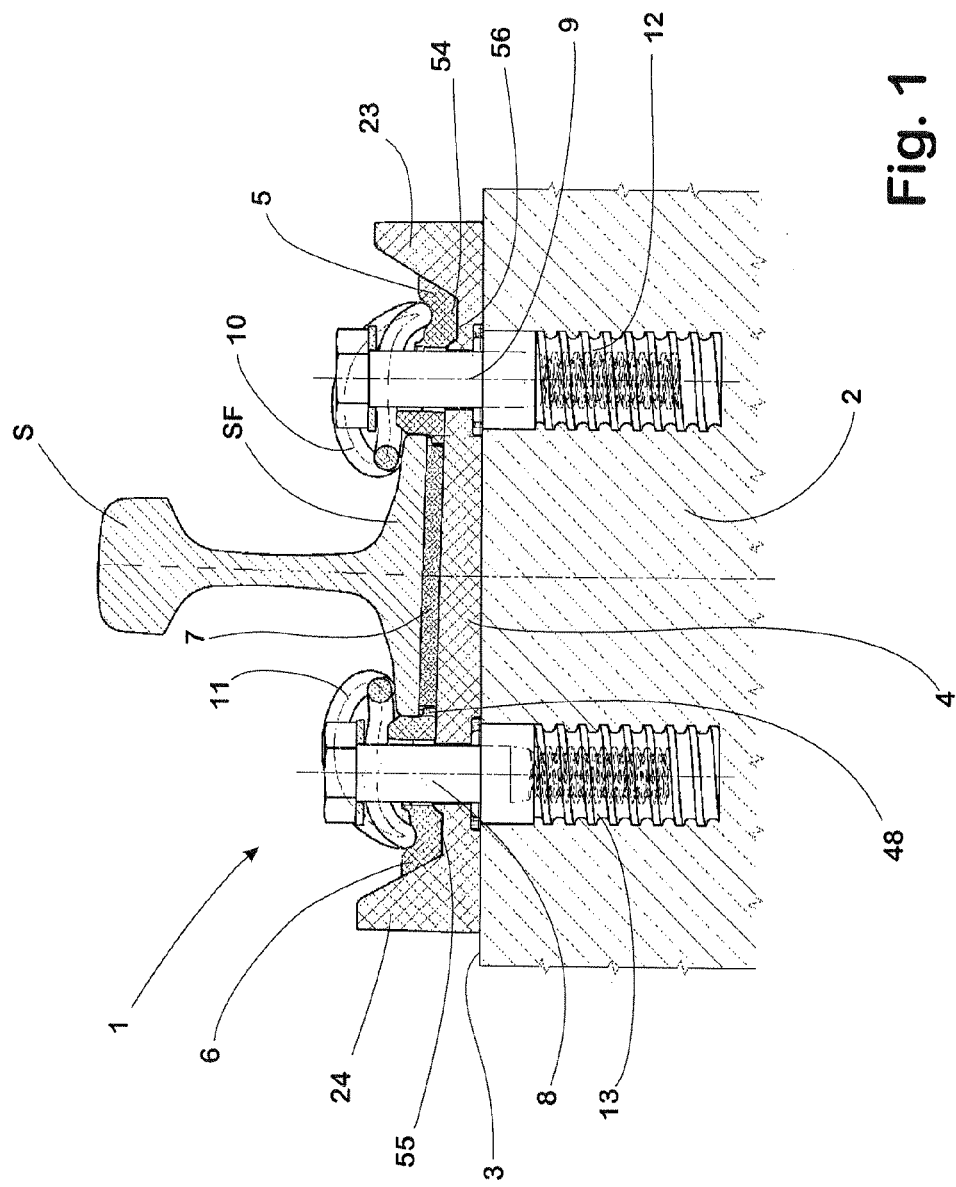
FIG. 1 shows a fastening point formed using a system according to the invention, for a rail in a fully mounted position, in a view that is partially sectioned in a longitudinal direction of the sleeper.
Figure 2:
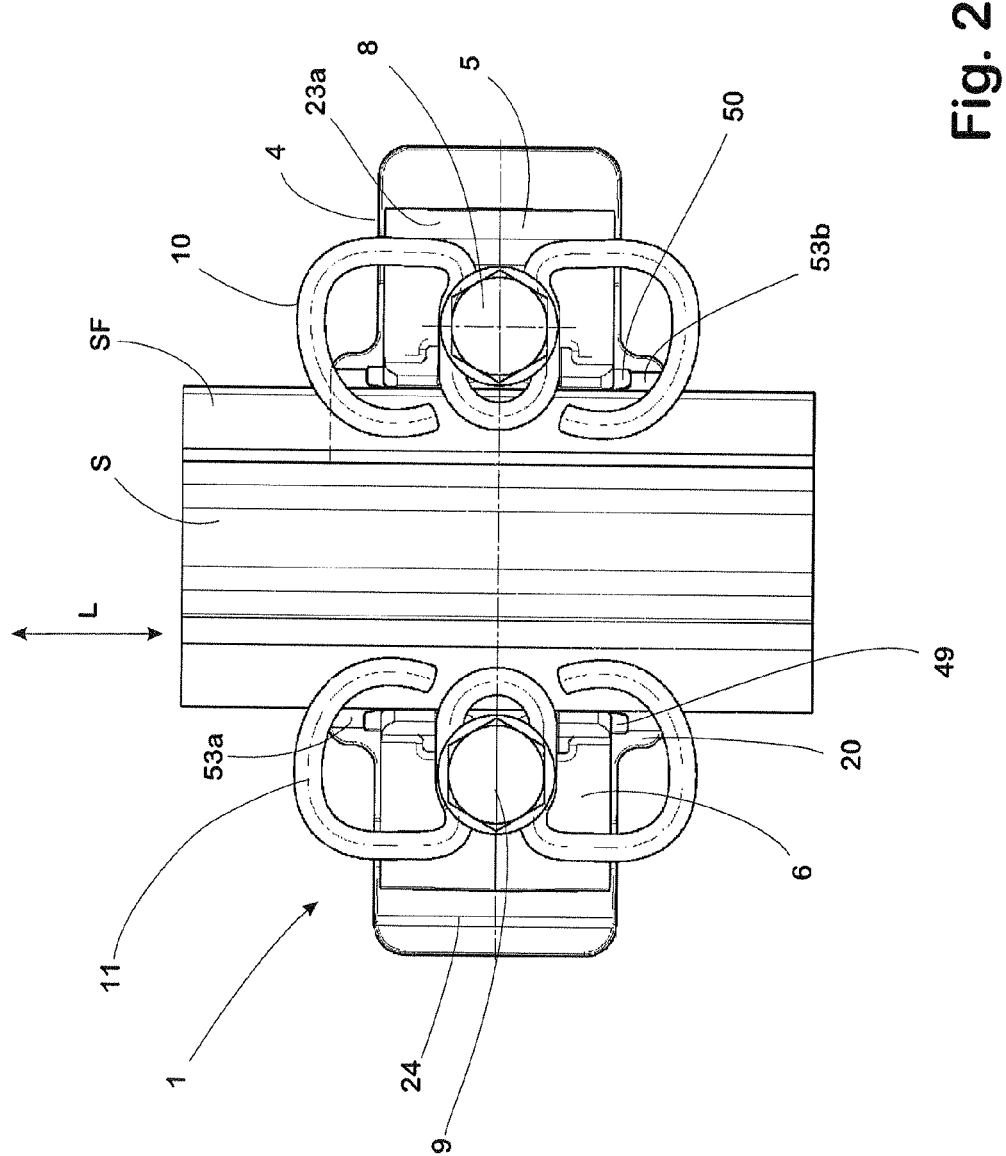
FIG. 2 shows the fastening point according to FIG. 1 in a top view.
Figure 3:
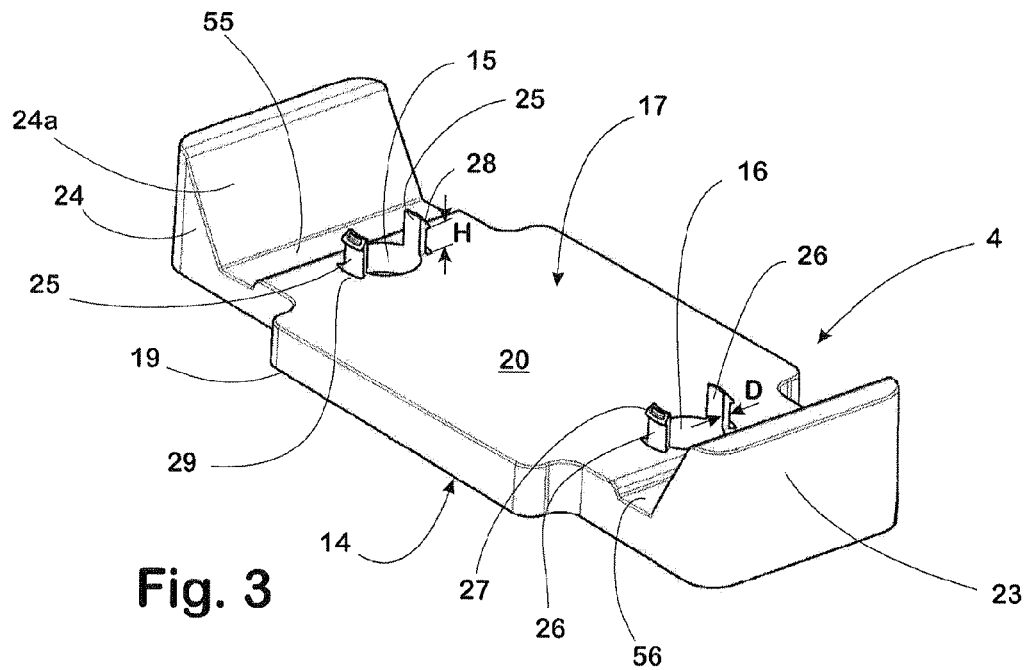
FIG. 3 shows a perspective view of a support plate used in the system shown in FIG. 1.
Figure 4:
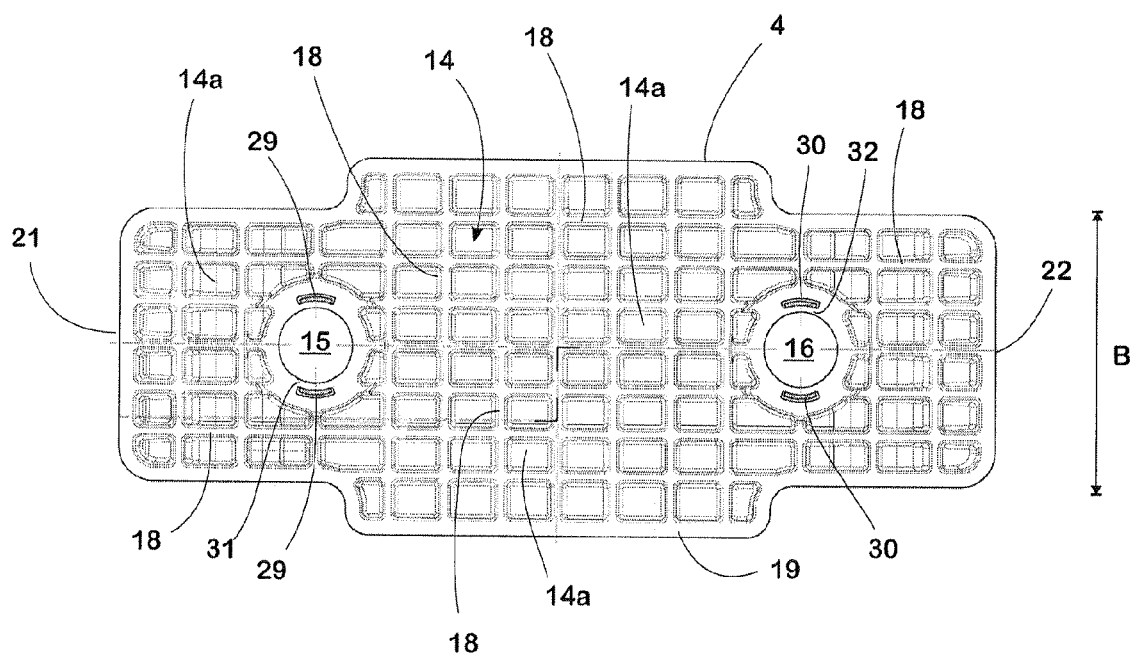
FIG. 4 shows the support plate according to FIG. 3 in a bottom view.
Figure 5:
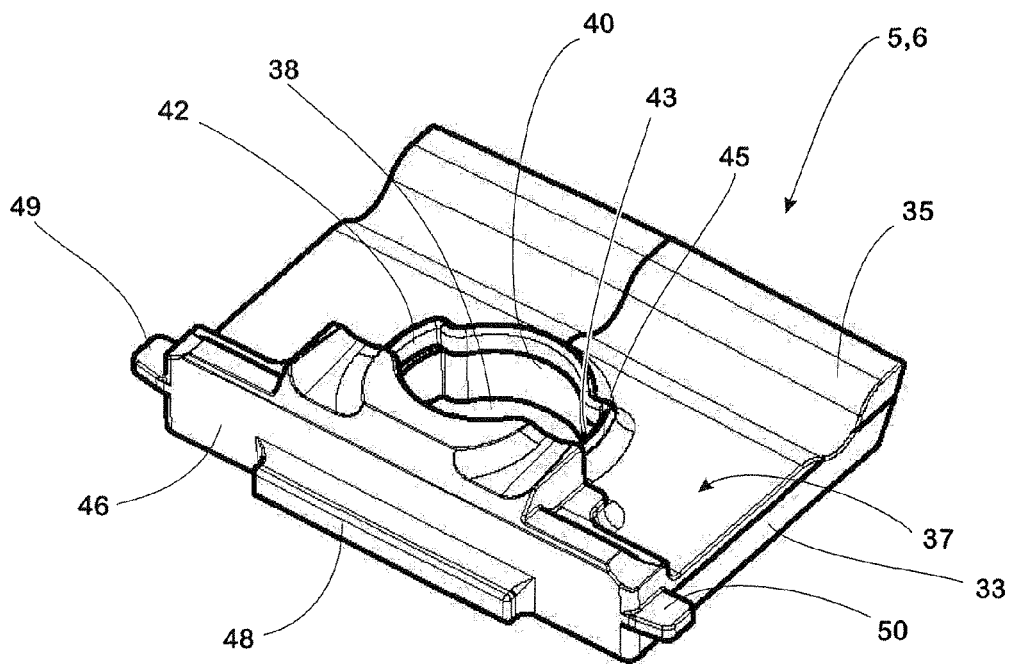
FIG. 5 shows a perspective view of the guide plate used in the system illustrated in FIG. 1.
Figure 6:
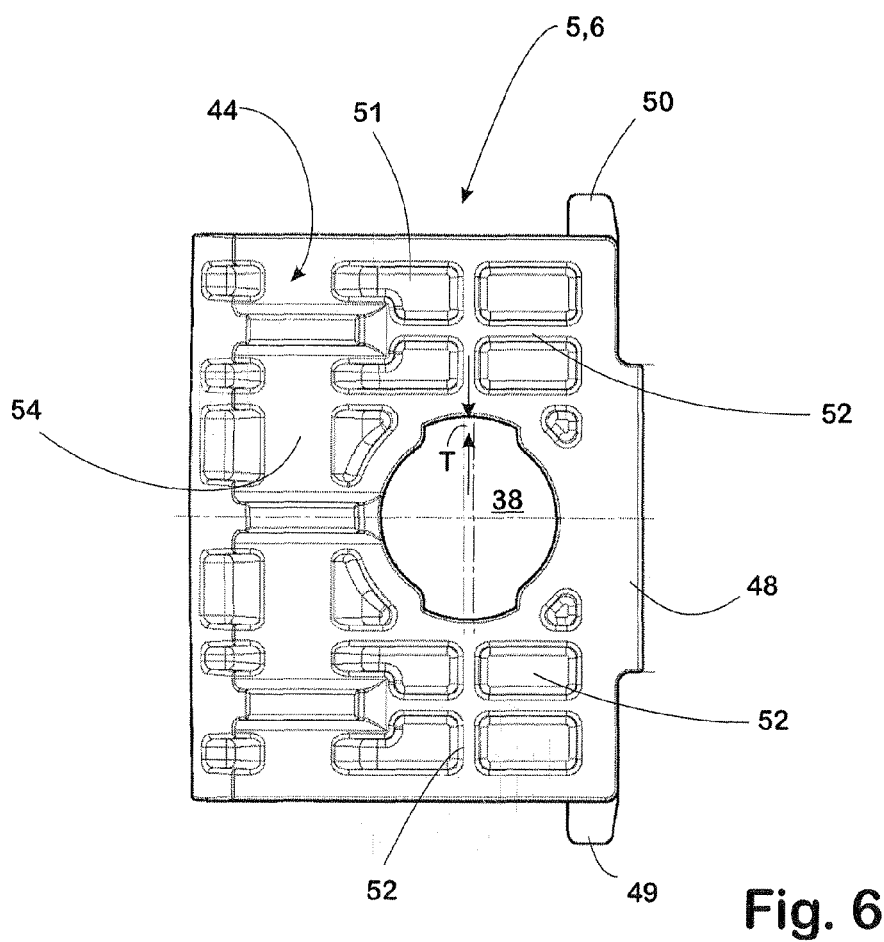
FIG. 6 shows the guide plate according to FIG. 5 in a bottom view.

The fastening point 1 shown in FIG. 1 for fastening a rail S comprises a sleeper 2, of which only a section is shown here and on the top side of which a planar contact surface 3 is formed.

On the sleeper 2, the rail S is fastened by means of a system that comprises a support plate 4 lying on the support surface 3 of the sleeper 2, two guide plates 5, 6, an elastic layer 7 resting on the support plate 4, two clamping elements 8, 9 formed as conventional sleeper bolts, two spring elements 10, 11 formed as ω-shaped clamps, as well as two plastic plugs 12, 13.

The plastic plugs 12, 13 have been cast into the sleeper 2 at a distance from each other. Here, their openings are respectively flush with the planar support surface 3 of the sleeper 2, and their longitudinal axis is oriented substantially perpendicularly to the support surface 3.

The support plate 4 lies with its flat bottom side 14 flat on the support surface 3 of the sleeper 2. Passage openings 15, 16 are moulded into the support plate 4, which passage openings respectively pass from the top side 17 to the bottom side 14 of the support plate 4. The passage openings 15, 16 are respectively spaced apart in such a way that they are seated, in the mounting position, in respective alignment with one of the plastic plugs 12, 13. At the same time, the shape and the diameter of the passage openings 15, 16 are dimensioned such that the clamping elements 8, 9 can be freely pushed through them with their thread section with sufficient play.

From the bottom side 14, recesses 14a distributed in regular intervals are moulded into the support plate 4, which recesses respectively have a rectangular opening cross section and are separated from each other by ribs 18 which are provided in regular intervals and which intersect each other crosswise. As a result of the recesses 14a, the material volume and, in conjunction with this, the weight of the support plate 4 are markedly reduced compared to a solid support plate. At the same time, the rib structure formed by the ribs 18 ensures an optimal rigidity of the support plate 4.

The support plate 4 has, in a top view, an elongate rectangular shape, the central section 19 of which is wider in order to form an enlarged contact area 20 for the rail S. As usual, the support plate 4 is, when the fastening point 1 is fully mounted, oriented transversely to the longitudinal extension L of the rail S. Its narrow sides 21, 22 extend here parallel to the rail S.

At its lateral ends, which are adjacent to the narrow sides 21, 22, the support plate 4 respectively has a shoulder 23, 24 extending over the width B thereof. On the side facing the rail S, the shoulders 23, 24 respectively have an angled surface 23a, 24a which rises, proceeding from the contact area 20, in the direction of the respective narrow side 21, 22 of the support plate 4.

In the region of the passage openings 15, 16, a pair of latch arms 25, 26 is respectively provided on the support plate 4, which are positioned opposite each other and adjacent to the edge of the respective passage opening 15, 16. The latch arms 25, 26 carry on the free ends thereof at a height H above the planar contact surface 20 of the support plate 4 respectively one latch projection 27, 28, which are laterally oriented and face away from the associated passage opening 15, 16. The distance of the latch arms 25, 26 from each other is also dimensioned such that the clamping elements 8, 9 can respectively be freely pushed with sufficient play with their thread section through the space laterally delimited by the latch arms 25, 26.

On the side of the latch arms 25, 26, which faces away from the respective passage opening 15, 16, an additional recess 29, 30 is respectively moulded into the support plate 4, which recess is formed as a slot-shaped passage opening and adjoins laterally directly onto the respective latch arm 25, 26. In this way, the latch arms 25, 26 are respectively connected to the remaining body of the altogether integrally formed support plate 4 only by a narrow, land-like section 31, 32.

The guide plates 5, 6, which are also made from a plastics material, respectively have a guide section 33 and a shoulder section 35, which in the case of the guide plate 5, 6 provided on the support plate 4 is supported on the respectively associated shoulder 23, 24 of the support plate 4.

A passage opening 38, which leads from the free top side 37 of the respective guide plate 5, 6 to its bottom side associated with the support plate 4, is respectively moulded into the guide section 33 of the guide plates 5, 6. Their position is adapted to the position of the respectively associated passage opening 15, 16 of the support plate 4 in such a way that the passage openings 38 are in alignment with each other in the case of guide plates 5, 6 placed on top of the support plate 4.

The shape and the diameter of the passage openings 38 of the guide plates 5, 6 are dimensioned such that the clamping elements 8, 9 can be pushed with their thread section, with slight play, through the passage openings 38, so that the guide plates 5, 6, with the clamping elements 8, 9 screwed into the plastic plugs 12, 13, are tightly retained by the clamping elements 8, 9 in their respective position relative to the sleeper 2 and to the other components of the system 1.

In the circumferential surfaces 40 delimiting the passage openings 38 of the guide plates 5, 6, two groove-shaped recesses 42, 43 are formed, which respectively extend from the top side 37 to the bottom side 44 of the guide plates 5, 6. The recesses 42, 43 are disposed here opposite each other in a position that corresponds to the position of the respectively associated latch arms 25, 26 of the support plate 4. At the same time, the depth T and the width of the recesses 42, 43 are adapted to the thickness D and the width of the latch arms 25, 26 in such a way that, with the guide plates 5, 6 placed on the support plate 4 and resting against the shoulders 23, 24, the latch arms 25, 26 are fully seated in the respectively associated recesses 42, 43. At the same time, the height H, at which the latch projections 27, 28 are provided above the top side 37 of the guide plates 5, 6, is dimensioned such that the latch projections 27, 28 rest, with the guide plates 5, 6 seated on the support plate 4, on the edge region 45 of the free top side 37 of the guide plates 5, 6, which delimits the respective recess 42, 43. Correspondingly, the edge region 45 forms a stop for the latch arms 25, 26, so that each guide plate 5, 6, with the guide plates 5, 6 placed on the support plate 4, [sic] a latch connection is formed, through which the guide plate 5, 6 is respectively retained against the support plate 4 in an interlocking and captive manner.

On the front side that is associated with the rail S, a support surface 46 is respectively provided on the guide sections 33 of the guide plates 5, 6, on which support surface the rail base SF of the rail S is laterally guided, once the fastening point 1 has been fully mounted. On its bottom edge, on which it merges with the bottom side 44 of the guide plate 5, 6, a ledge-like projection 48 is respectively formed in the resting surface 46 of the guide plates. In addition, the guide plates 5, 6 have, on their short sides, respectively one projection 49, 50 laterally protruding away from the guide section 33 in the extension of the resting surface 46, which projection is provided at a certain distance from the bottom side 44 of the guide plate 5, 6.

Like in the support plate 4, recesses 51 are also moulded in the guide plates 5, 6 from the bottom side 44 for saving in weight and material, which recesses are also, as in the case of the support plate 4, separated from each other by ribs 52 which ensure the dimensional rigidity of the guide plates 5, 6.

The elastic layer 7, which in the mounted position lies on the contact surface 20 of the support plate 4, is made from an elastic material having a defined resilience and allows a correspondingly defined elastic downward deflection of the rail S when driven over by a rail vehicle (not shown). The form of the elastic layer 7 corresponds here to the form of the contact surface 20 of the support plate 9 and is dimensioned such that the elastic layer 7 fully covers the contact surface 20 with the exception of a small margin area. In this context, tongue-like projections 53a, 53b are respectively moulded onto the narrow sides of the elastic layer 7, which are associated with the guide plates 5, 6, the position and form of which projections are adapted to the ledge-like projection 48 and the lateral projections 49, 50 of the guide plates 5, 6 in such a way that in the case of an elastic layer 7 lying on the support plate 4 and in the case of the guide plates 5, 6 locked together with the support plate 4, the lateral projections 49, 50 of the guide plates 5, 6 press onto the tongue-like projections 53a, 53b of the elastic layer 7, and the elastic layer 7 is thus retained in a captive manner between the guide plates 5, 6.

The respective shoulder section 35 forms on the bottom side 44 of the guide plates 5, 6 a low-level offset 54 that protrudes downwards over the width of the guide plates 5, 6. Once the fastening point 1 has been fully mounted, the respective offset 54 of the guide plates 5, 6 is seated in respectively one groove 55, 56, which is moulded into the contact surface 20 of the support plate 4 from the top side thereof. In this respect, the grooves 55, 56 are adjacent to the respective angled surface 23a, 24a of the shoulders 23, 24.

The spring elements 10, 11 provided for exerting the required hold-down forces are formed as ω-shaped clamps. The spring elements 10, 11 correspondingly have a U-shaped central section, on which in the fully mounted condition of the fastening point 1, the respectively associated clamping element 8, 9 acts with its bolt head. The legs of the central section of the spring elements 10, 11 merge into respectively one holding arm, by means of which the spring element 10, 11 presses, in the mounting position, onto the side of the rail base SF that is respectively associated therewith in a spring-elastic manner. The end sections of the holding arms are here bent in a continuous curve in the direction of the central section of the spring elements 10, 11 and terminate at a distance from the central section, which is smaller than the smallest thickness of the spring wire from which the spring elements 10, 11 have been bent. In this way it is ensured that the spring elements 10, 11 will not get caught in each other even if they are supported in a transport container in a loose and untidy manner.

From respectively one support plate 4 and the guide plates 5, 6 locked together therewith as well as the elastic layer 7 retained on the support plate 4 by the guide plates 5, 6, a modular unit is pre-mounted at the manufacturer's site. Such a modular unit is placed on the contact surface 3 of the sleeper 2 for mounting the fastening point 1 in such a way that the passage openings 15, 16 of the support plate 4 and the passage openings 40 of the guide plates 5, 6 are in alignment with the plastic plugs 12, 13 seated in the sleeper 2. Subsequently, the spring elements 10, 11 are placed in a manner per se known in a pre-mounting position on the associated guide plate 5, 6, in which their spring arms do not yet reach into the region provided for the rail S between the guide plates 5, 6, and are pretensioned by means of the clamping elements 8, 9 respectively screwed into one of the plugs 12, 13, so that they automatically retain their pre-mounted position but can be displaced in the direction of the rail S. Subsequently, the rail S is placed on the elastic layer 7. In the case of a rail S seated on the elastic layer 7, the ledge-type projections 48 of the guide plates 5, 6 laterally engage under the rail base SF. At this point, the spring elements 10, 11 are pushed in the direction of the rail S up to an end position in which the spring arms thereof respectively press on the rail base SF. Subsequently, the tensioning elements 8, 9 are tightened until the spring elements 10, 11 exert the specified hold-down force on the base SF of the rail S.

REFERENCE NUMERALS

1 Fastening point
2 Sleeper
3 Support surface
4 Support plate
5, 6 Guide plates
7 Elastic layer
8, 9 Clamping elements (sleeper bolts)
10, 11 Spring elements (clamps)
12, 13 Plastic plugs
14 Bottom side of the support plate 4
14a Recesses of the support plate 4
15, 16 Passage openings of the support plate 4
17 Top side of the support plate 4
18 Ribs of the support plate 4
19 Central section of the support plate 4
20 Contact surface of the support plate 4
21, 22 Narrow sides of the support plate 4
23, 24 Shoulder of the support plate 4

23a, 24a Angled surfaces of the shoulders 23, 24
25, 26 Latch arms of the support plate 4
27, 28 Latch projections
29, 30 Slot-shaped recesses of the support plate 4
31, 32 Land-like sections of the support plate 4
33 Guide section of the guide plates 5, 6
35 Shoulder section of the guide plates 5, 6
37 Free top side of the guide plates 5, 6
38 Passage opening of the guide plates 5, 6
40 Circumferential surfaces of the passage openings 38
42, 43 Recesses in the passage openings 38
44 Bottom side of the guide plates 5, 6
45 Edge region of the free top side 37, which delimits the respective recess 42, 43
46 Resting surface of the guide plates 5, 6
48 Ledge-type projection of the guide plates 5, 6
49, 50 Laterally protruding projection of the guide plates 5, 6
51 Recesses of the guide plates 5, 6
52 Ribs of the guide plates 5, 6
53a, 53b Tongue-type projections of the elastic layer 7
54 Offset of the support section 35 of the guide plates 5, 6
55, 56 Grooves of the support plate 4
B Width of the support plate 4
D Thickness of the latch arms
H Height of the latch projections 27, 28 above the planar contact surface 20 of the support plate 4
L Longitudinal extension of the rail S aligned [sic]
S Rail
SF Rail base of the rail S
T Depth of the recesses 42, 43

The invention claimed is:

1. A system for fastening a rail on a subsurface, comprising:
 a support plate having a contact surface for the rail to be fastened, and
 at least one guide plate that is seated on said support plate and has a passage opening for a clamping element, which leads from a free top side thereof to a bottom side thereof which rests on said support plate, which clamping element is guided, with the system fully installed, through the passage opening and is fixedly connected to the subsurface,
 wherein a latching connection between said support plate and said guide plate is formed in a region of said passage opening of said guide plate by at least one latch arm, which latch arm engages through said passage opening of said guide plate and has a latch projection on a free end thereof, which interacts in an interlocking manner with a stop formed on said guide plate, and wherein
 a recess is moulded into a circumferential surface delimiting said passage opening of said guide plate, in which recess the latch arm is seated.

2. The system as claimed in claim 1, wherein said latch arm has associated therewith a recess moulded into said support plate, which recess laterally borders onto a lateral surface of said latch arm.

3. The system as claimed in claim 1, wherein said passage opening of said guide plate has associated therewith an opening moulded into said support plate.

4. The system as claimed in claim 3, wherein said latch arm adjoins said opening with a lateral surface that is associated with said opening of said support plate.

5. The system as claimed in claim 1, wherein the stop for the latch projection is formed by an edge region of the top side of said guide plate, which edge region delimits the passage opening of said guide plate at least in sections.

6. The system as claimed in claim 1, wherein at least two latch arms are provided, which commonly engage through said passage opening of said guide plate, each said latch arm has associated therewith a respective one said recess that is moulded into said circumferential surface delimiting said passage opening, in which recess the latch arm is seated.

7. The system as claimed in claim 1, wherein a depth of the recess that is respectively associated with said latch arm and is moulded into the circumferential surface that delimits said passage opening at least corresponds to a thickness of the latch arm.

8. The system as claimed in claim 1, wherein said guide plate is made from a plastics material.

9. The system as claimed in claim 1, wherein said support plate is moulded from a plastics material.

10. The system as claimed in claim 1, wherein recesses are moulded into said support plate or said guide plate from a bottom side thereof, which recesses are separated from each other by ribs.

11. The system as claimed in claim 1, wherein said support plate has a shoulder on at least one of the lateral ends thereof, on which the guide plate is supported.

12. The system as claimed in claim 11, wherein the at least one guide plate has one guide plate supported on each of said shoulders, said guide plates laterally delimit a contact surface for the rail, which is provided on said support plate, and wherein each of said guide plates is retained on said support plate by a respective one said latching connection.

13. The system as claimed in claim 1, further comprising an elastic layer which lies on a contact surface of said support plate and stands, in a fully mounted condition, on the rail to be fastened.

14. The system as claimed in claim 13, wherein the elastic layer is retained on said support plate by means of the guide plate locked together with said support plate.

15. The system as claimed in claim 14, wherein said guide plate has at least one projection, which in the fully mounted condition covers a corresponding projection of said elastic layer.

* * * * *